(12) United States Patent
Pijnenburg et al.

(10) Patent No.: US 10,206,427 B2
(45) Date of Patent: Feb. 19, 2019

(54) METHOD OF MAKING A ROD FOR USE AS AN AEROSOL-FORMING SUBSTRATE HAVING CONTROLLED POROSITY DISTRIBUTION

(71) Applicant: Philip Morris Products S.A., Neuchatel (CH)

(72) Inventors: Johannes Petrus Maria Pijnenburg, Neuchatel (CH); Marine Jarriault, Bern (FR)

(73) Assignee: Philip Morris Products S.A., Neuchatel (CH)

( * ) Notice: Subject to any disclaimer, the term of this patent is extended or adjusted under 35 U.S.C. 154(b) by 81 days.

(21) Appl. No.: 15/500,962

(22) PCT Filed: Aug. 12, 2015

(86) PCT No.: PCT/EP2015/068606
§ 371 (c)(1),
(2) Date: Feb. 1, 2017

(87) PCT Pub. No.: WO2016/023965
PCT Pub. Date: Feb. 18, 2016

(65) Prior Publication Data
US 2018/0177228 A1    Jun. 28, 2018

(30) Foreign Application Priority Data
Aug. 13, 2014   (EP) .................................... 14180876

(51) Int. Cl.
*A24C 5/34* (2006.01)
*A24F 47/00* (2006.01)
(Continued)

(52) U.S. Cl.
CPC .............. *A24F 47/004* (2013.01); *A24B 3/14* (2013.01); *A24B 15/16* (2013.01); *A24C 5/18* (2013.01);
(Continued)

(58) Field of Classification Search
CPC combination set(s) only.
See application file for complete search history.

(56) References Cited

U.S. PATENT DOCUMENTS 5,235,649 A    8/1993 Reda
6,531,693 B1   3/2003 Focke et al.
(Continued)

FOREIGN PATENT DOCUMENTS

CN    1280541 A    1/2001
CN    1306401 A    8/2001
(Continued)

OTHER PUBLICATIONS

Combined Office Action and Search Report dated Nov. 9, 2017 in Chinese Patent Application No. 201580040188.5 (with English language translation) citing references AO-AQ therein. 11 pages.
(Continued)

*Primary Examiner* — Eric Yaary
(74) *Attorney, Agent, or Firm* — Oblon, McClelland, Maier & Neustadt, L.L.P.

(57) ABSTRACT

There is provided a method of making rods having predetermined values of cross-sectional porosity, and a cross-sectional porosity distribution value for use as an aerosol-forming substrate in a heated aerosol-generating article, including providing a continuous sheet of aerosol-forming material having a specified width and a specified thickness; gathering the sheet transversely relative to a longitudinal axis thereof; circumscribing the gathered sheet with a wrapper to form a continuous rod; severing the rod into a plurality
(Continued)

Figure 1:
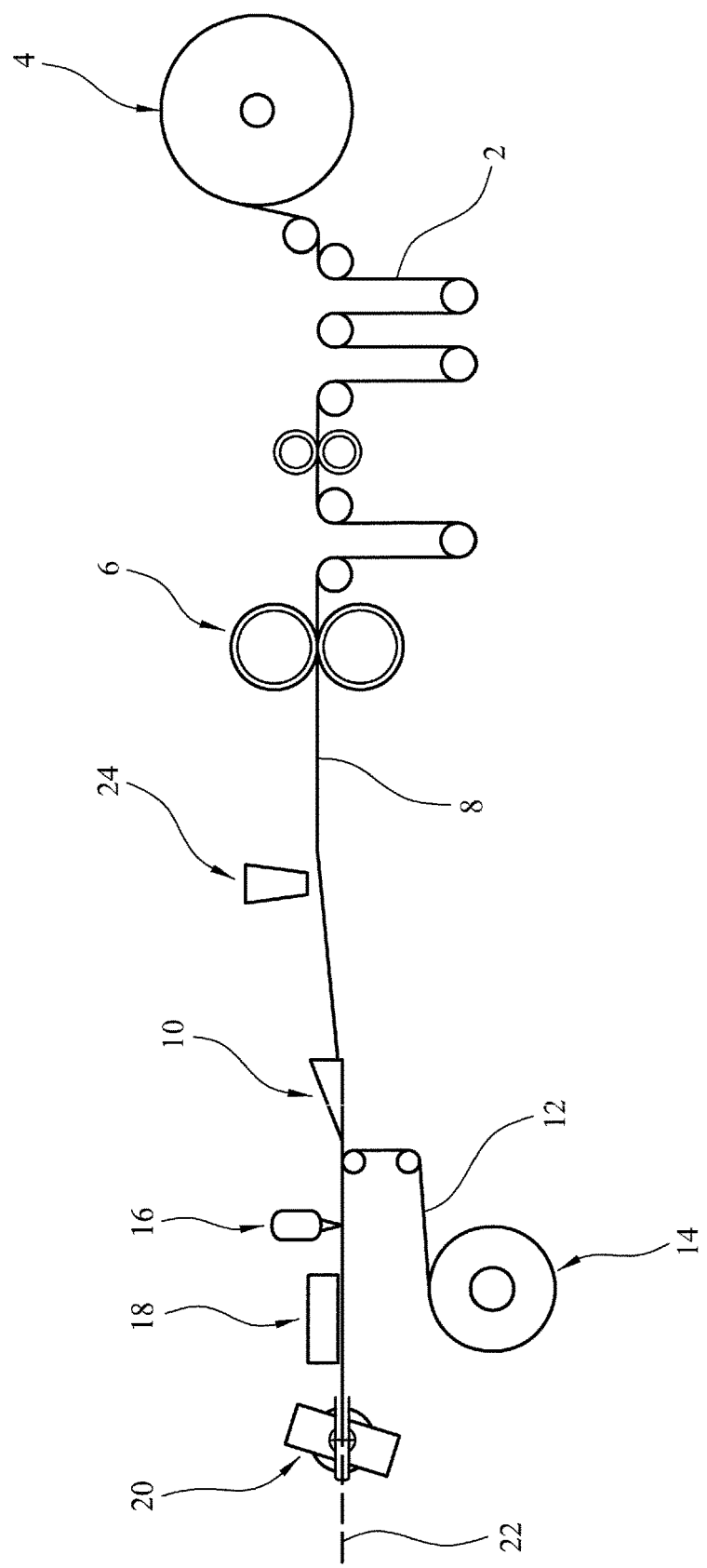

of discrete rods; determining values of cross-sectional porosity and cross-sectional porosity distribution for at least one of the discrete rods; and controlling one or more manufacturing parameters to ensure that the cross-sectional porosity and cross-sectional porosity distribution values of subsequent rods are within the predetermined values.

20 Claims, 11 Drawing Sheets

(51) Int. Cl.
    *A24B 3/14*     (2006.01)
    *A24C 5/18*     (2006.01)
    *A24B 15/16*     (2006.01)
    *G06T 7/00*     (2017.01)
    *A24D 3/02*     (2006.01)

(52) U.S. Cl.
    CPC .............. *A24C 5/1828* (2013.01); *A24C 5/34* (2013.01); *A24F 47/006* (2013.01); *G06T 7/001* (2013.01); *A24D 3/0204* (2013.01); *A24D 3/0233* (2013.01)

(56) References Cited

U.S. PATENT DOCUMENTS

| | | |
|---|---|---|
| 2005/0022831 A1 | 2/2005 | Hirsch et al. |
| 2013/0074854 A1 | 3/2013 | Lipowicz |
| 2014/0166032 A1 | 6/2014 | Gindrat |
| 2015/0027475 A1 | 1/2015 | Jarriault et al. |
| 2015/0150302 A1 | 6/2015 | Metrangolo et al. |
| 2015/0163859 A1 | 6/2015 | Schneider et al. |
| 2017/0164659 A1 | 6/2017 | Schneider et al. |

FOREIGN PATENT DOCUMENTS

| | | |
|---|---|---|
| CN | 103561583 A | 2/2014 |
| EP | 0 518 141 A2 | 12/1992 |
| EP | 2 625 974 A1 | 8/2013 |
| JP | 1-243979 A | 9/1989 |
| KR | 10-0158437 B1 | 12/1998 |
| WO | WO 2009/022232 A2 | 2/2009 |
| WO | 2012/164009 A2 | 12/2012 |
| WO | WO 2013/098405 A2 | 7/2013 |
| WO | WO 2013/120565 A2 | 8/2013 |
| WO | 2013/178766 A1 | 12/2013 |
| WO | WO 2013/190036 A1 | 12/2013 |
| WO | WO 2014/102092 A1 | 4/2014 |
| WO | WO 2014/125049 A1 | 8/2014 |
| WO | WO 2015/022317 A1 | 2/2015 |
| WO | WO 2015/022320 A2 | 2/2015 |
| WO | WO 2015/022321 A1 | 2/2015 |

OTHER PUBLICATIONS

Office Action dated Nov. 30, 2017 in Korean Patent Application No. 10-2017-7002291 (with English language translation) citing references AA—AB, AO therein, 14 pages.
Korean Office Action dated Jun. 16, 2017 in Korean Patent Application No. 10-2017-7002291 (with English translation).
International Preliminary Report on Patentability dated Jun. 3, 2016 in PCT/EP2015/068606.
International Search Report and Written Opinion dated Oct. 12, 2015 in PCT/EP2015/068606 filed Aug. 12, 2015.
Trinkies, Wolfgang et al., "X-Ray Absorption Analysis by Image Processing Techniques," SPIE, Image Processing II, 1988, vol. 1027, XP55068616, pp. 226-231.
Extended European Search Report dated Nov. 28, 2017 in Patent Application No. 17190706.6.

Figure 12　　　　　　　Figure 13
Figure 14　　　　　　　Figure 15

METHOD OF MAKING A ROD FOR USE AS AN AEROSOL-FORMING SUBSTRATE HAVING CONTROLLED POROSITY DISTRIBUTION

The specification relates to a method of making rods for use as aerosol-forming substrates in heated aerosol-generating articles, and to rods produced by the method. The resulting rods have predetermined porosity and porosity distribution values. The specification also relates to heated aerosol-generating articles comprising such rods, wherein the porosity and porosity distribution are optimised to control aerosol attributes of the heated aerosol-generating article.

Aerosol-generating articles in which an aerosol-forming substrate, such as a tobacco-containing substrate, is heated rather than combusted, are known in the art. One aim of such heated smoking articles is to reduce known harmful smoke constituents of the type produced by the combustion and pyrolytic degradation of tobacco in conventional cigarettes.

Typically in such heated aerosol-generating articles an aerosol is generated by the transfer of heat from a heat source, such as an electric heater or a combustible heat source, to a physically separate aerosol-forming substrate or material, which may be located in contact with, within, around, or downstream of the heat source. During consumption of the aerosol-generating article, volatile compounds are released from the aerosol-forming substrate by heat transfer from the heat source and are entrained in air drawn through the aerosol-generating article. As the released compounds cool, they condense to form an aerosol that may be inhaled by the user.

As used herein, the term "heated aerosol-generating article" refers to an aerosol-generating article comprising an aerosol-forming substrate that is intended to be heated rather than combusted in order to release volatile compounds that can form an aerosol. Such articles could also be termed heatable aerosol-generating articles.

A number of prior art documents disclose aerosol-generating devices for consuming or smoking heated aerosol-generating articles. Such devices include, for example, electrically heated aerosol-generating devices in which an aerosol is generated by the transfer of heat from one or more electrical heating elements of the aerosol-generating device to the aerosol-forming substrate of a heated aerosol-generating article. One advantage of such electrically heated aerosol-generating devices is that they significantly reduce sidestream smoke, while permitting a user to selectively suspend and re-initiate smoking.

Substrates for heated aerosol-generating articles have, in the past, typically been produced using randomly oriented shreds, strands, or strips of tobacco material. The formation of rods for heated smoking or aerosol-generating articles from shreds of tobacco material suffers from a number of disadvantages. For example, the process of shredding tobacco material undesirably generates tobacco fines and other waste. Rods comprising shreds of tobacco material may exhibit "loose ends", that is a loss of shreds of tobacco material from the ends of the rods. Rods comprising shreds of tobacco material may exhibit high standard deviations in weight, partially due to the tendency of rods to exhibit loose ends. Also, rods comprising traces of tobacco material tend to exhibit non-uniform densities, that is, the density along the length of the rod tends to be inconsistent due to variations in the quantity of tobacco material at different locations along the rod.

WO 2012/164009 discloses rods for heated aerosol-generating articles formed from gathered sheets of tobacco material. The rods disclosed in WO 2012/164009 have a longitudinal porosity that allows air to be drawn through the rods. Effectively, folds in the gathered sheets of tobacco material define longitudinal channels through the rod. The use of rods formed from gathered sheets of homogenised tobacco material addresses some of the problems associated with forming an aerosol-forming substrate from shredded tobacco.

As described and defined in this specification, a method of making aerosol-forming rods having predetermined values of cross-sectional porosity and cross-sectional porosity distribution value for use as aerosol-forming substrates in a heated aerosol-generating articles, comprises the steps of: providing a continuous sheet of aerosol-forming material having a specified width and a specified thickness, gathering the continuous sheet of aerosol-forming material transversely relative to the longitudinal axis thereof, circumscribing the gathered continuous sheet of aerosol-forming material with a wrapper to form a continuous rod, severing the continuous rod into a plurality of discrete rods, determining values representative of cross-sectional porosity and cross-sectional porosity distribution for at least one of the discrete rods, and controlling one or more manufacturing parameters to ensure that the cross-sectional porosity and cross-sectional porosity distribution values of subsequent rods are within the predetermined values to produce the aerosol-forming rods.

The continuous sheet of aerosol-forming material may be a smooth sheet. Alternatively, the continuous sheet may be treated to facilitate the gathering of the sheet. For example, the continuous sheet may be grooved, creased, folded, textured, embossed, or otherwise treated to provide lines of weakness to facilitate gathering. A preferred treatment for the continuous sheet is crimping.

Thus, in preferred embodiments a method of making aerosol-forming rods having predetermined values representative of cross-sectional porosity and cross-sectional porosity distribution for use as aerosol-forming substrates in heated aerosol-generating articles, may comprise the steps of: providing a continuous sheet of aerosol-forming material having a specified width and a specified thickness, crimping the continuous sheet of aerosol-forming material, gathering the crimped continuous sheet of aerosol-forming material transversely relative to the longitudinal axis thereof, circumscribing the crimped and gathered continuous sheet of aerosol-forming material with a wrapper to form a continuous rod, severing the continuous rod into a plurality of discrete rods, determining values representative of cross-sectional porosity and cross-sectional porosity distribution for at least one of the discrete rods, and controlling one or more manufacturing parameters to ensure that the cross-sectional porosity and cross-sectional porosity distribution values of subsequent rods are within the predetermined values to produce the aerosol-forming rods.

By controlling both the porosity and the porosity distribution values of an aerosol-forming rod to within predetermined limits, the quality and repeatability of a smoking experience may be optimised. By controlling both the porosity and the porosity distribution values of the aerosol-forming rod it may be possible to tailor aerosol attributes such as nicotine delivery for specific types of aerosol generating devices or aerosol-generating systems.

It is noted that the discrete rods may be of a length suitable for use as aerosol-generating substrates in aerosol-generating articles. One or more of the rods may be analysed. For example, one rod out of every 100 may be analysed. The discrete rods may be rods intended for further processing. For example, the discrete rods may be subsequently severed into multiple smaller rods.

The one or more manufacturing parameters that can be controlled may be one or more parameters selected from the list consisting of width of the continuous sheet of aerosol-forming material, thickness of the continuous sheet of aerosol-forming material, diameter of rod, and, where the sheet is crimped, depth of crimping the continuous sheet of aerosol-forming material, and width of crimping applied to the sheet.

The method may comprise the step of determining values of cross-sectional porosity and cross-sectional porosity distribution for at least one of the discrete rods and, if the values are not within desired predetermined values, varying the one or more parameters to change the values of cross-sectional porosity and cross-sectional porosity distribution in subsequent rods. It may be desirable to determine values of cross-sectional porosity and cross-sectional porosity distribution for more than one of the discrete rods to provide greater statistical accuracy.

The sheet of aerosol forming material may be any suitable sheet material that can generate an aerosol when heated. In some embodiments the aerosol-forming material may comprise a nicotine salt. For example, the aerosol-forming material may be a non-tobacco sheet formed from paper or a polymer that is impregnated or coated with a nicotine salt such as nicotine pyruvate. In other embodiments the sheet of aerosol-forming material may be a sheet of tobacco material comprising tobacco and an aerosol former.

The term "sheet of aerosol-forming material" may refer to two or more sheets of aerosol-forming material. For example, two sheets of tobacco material may be gathered together to form a rod, or a sheet of tobacco material and a sheet of non-tobacco material may be gathered together to form a rod. If two or more sheets are present, one or more of those sheets may be treated to facilitate gathering of the sheets to form a rod.

The specified width of the sheet of aerosol forming material is preferably between 70 mm and 250 mm, for example between 120 mm and 160 mm. The specified thickness of the sheet of aerosol-forming material is preferably between 50 micrometers and 300 micrometers, preferably between 150 micrometers and 250 micrometers.

Preferably the diameter of the rods formed is between 5 mm and 10 mm, preferably between 6 mm and 9 mm, or between 7 mm and 8 mm.

It may be advantageous that the sheet is crimped or similarly treated. Crimping is a process in which corrugations are introduced into the sheet of aerosol-forming material. The crimping depth of the corrugations may be varied, and may be quantified as an amplitude of corrugation. This is effectively a measure of the distance that a pair of corrugation rollers overlap. The amplitude may also be measured from trough to trough of the crimped sheet, so as to eliminate the thickness of the sheet itself from the measurement. Preferably, the crimped continuous sheet of aerosol-forming material has an amplitude of corrugation, or crimping depth, of between 50 micrometers and 300 micrometers, more preferably between about 100 and about 250 micrometers.

As used herein, the term "porosity" refers to a fraction of void space in a porous article. The terms "global porosity" or "cross-sectional porosity" refer to the fraction of void space in a cross-sectional area of a porous article, for example a cross-section of a rod formed from a crimped and gathered sheet of aerosol-forming material. The cross-sectional porosity is the area fraction of void space of the transverse cross-sectional area of the rod. The transverse cross-sectional area of the rod is the area of the rod in the plane that is perpendicular to the longitudinal axis of the rod.

As used herein, the terms "porosity distribution values", or "cross-sectional porosity distribution values", refer to the standard deviation of porosity values locally determined within each of a plurality of identically dimensioned sub-areas of the transverse cross-sectional area of the rod. The porosity within a sub-area may be referred to as "local porosity", and the cross-sectional porosity distribution value is the standard deviation of the local porosity values over the transverse cross-sectional area of the rod.

A sub-area refers to an area that is smaller than the transverse cross-sectional area of the rod. The plurality of identically dimensioned sub-areas covers the entire transverse cross-sectional area of the rod. Preferably, each sub-area overlaps at least one adjacent sub-area, preferably more than one adjacent sub-area. Preferably, each sub-area overlaps at least one adjacent sub-area by between 10% and 95%. Preferably, each sub-area is less than 20% of the entire transverse cross-sectional area, for example less than 15% of the entire transverse cross-sectional area, preferably less than 10% of the entire transverse cross-sectional area.

The rods will typically be substantially circular. The transverse cross-sectional area will therefore be substantially circular. Each sub-area is preferably rectangular or square. It is preferred that a sub-area overlaps at least 50% of the transverse cross-sectional area before it is included in the calculation of porosity distribution, particularly preferably at least 70% or at least 80% or at least 90% of the transverse cross-sectional area before it is included in the calculation of porosity distribution.

The transverse cross-sectional porosity of the rod varies as a function of rod diameter, width of the sheet of aerosol-forming material, and thickness of the sheet of aerosol-forming material. Thus, the cross-sectional porosity may be calculated using the formula:

$$P_{cross} = \frac{\pi(D_{rod}/2)^2 - (W_{sheet} \cdot T_{sheet})}{\pi(D_{rod}/2)^2}$$

Where,
$P_{cross}$=cross-sectional porosity
$D_{rod}$=Diameter of the rod
$W_{sheet}$=Width of the sheet gathered to form the rod
$T_{sheet}$=Thickness of the sheet gathered to form the rod The cross-sectional porosity distribution value refers to a measure of the variation in local porosity over different sub-areas of the transverse cross-sectional area of the rod.

Cross-sectional porosity distribution value is, thus, a quantitative measure of the distribution of porosity over the transverse area of the article. The local porosity of each sub-area may be calculated using the formula;

$$P_{local} = \frac{A_{local} - A_{sheet}}{A_{local}}$$

Where,
$R_{local}$=cross-sectional porosity of a sub-area
$A_{local}$=Area of the sub-area
$A_{sheet}$=Area of tobacco material within the sub-area The cross-sectional porosity distribution value may be seen to be a measure of the uniformity of porosity of a rod. For example, if the standard deviation of the local porosity is low, then the voids within the rod are likely to be uniformly distributed over the entire transverse area of the rod, and of similar sizes. However, if the standard deviation is high then the voids are not uniformly distributed over the transverse area of the article, some sections of the rod having a high porosity and some having low porosity. For a given cross-sectional porosity, a high cross-sectional porosity distribution value may be an indication that a rod has a small number of relatively large through-channels, whereas a low cross-sectional porosity distribution value may indicate that a rod has a high number of relatively small through-channels.

A cross-sectional porosity distribution value may be determined from local porosity values calculated for multiple sub-areas covering the transverse cross-section of a single rod. A cross-sectional porosity distribution value relating to any individual rod may be compared with that of another individual rod. Alternatively, a cross-sectional porosity distribution value may be calculated from local porosity values derived from a number of different rods of approximately the same cross sectional area and approximately the same cross-sectional porosity, for example a set or batch of rods. The cross-sectional porosity distribution value from a batch of rods may be used to evaluate the quality of porosity between one batch of rods and another batch of rods.

Advantageously, the transverse cross-sectional porosity and the cross-sectional porosity distribution value may be determined using a digital imaging process. An image of a transverse cross-section of the rod may be obtained and a threshold may be applied to differentiate pixels that represent aerosol-forming substrate from pixels that represent void. A porosity of the entire cross-section may then be easily obtained.

Preferably the cross-sectional porosity distribution value is determined by a method comprising the steps of, obtaining a digital image of a transverse cross-sectional area of the rod, determining the area fraction of voids present within each of a plurality of identically dimensioned sub-areas of the transverse area, thereby obtaining a porosity value for each of the plurality of identically dimensioned sub-areas, and calculating the standard deviation of the porosity values for each of the plurality of identically dimensioned sub-areas. Each sub-area overlaps at least one adjacent sub-area by between 10% and 95%, preferably by between 75% and 85%, preferably about 80%.

Typically the rod will be approximately cylindrical and will have an average diameter, for example an average diameter of about 7 mm. Preferably each of the sub-areas is a rectangle or square having a length of between a quarter and an eighth of the diameter of the rod, preferably about a sixth or a seventh of the diameter of the rod. Thus, if the diameter of the rod is about 7 mm, the sub-areas may be squares having sides of about 1 mm in length.

The porosity value of any individual sub-area is preferably only included in the calculation for evaluating porosity distribution if more than 90% of that sub-area is within the transverse cross-sectional area of the rod.

Preferably the digital image of the transverse cross-sectional area consists of a plurality of pixels, and every pixel making up the transverse cross-sectional area is contained within at least one of the plurality of sub-areas.

The one or more manufacturing parameters may be controlled to produce an aerosol-forming rod formed having a cross-sectional porosity of between about 0.15 and 0.45, preferably between about 0.20 and 0.40, preferably between about 0.25 and about 0.35.

The one or more manufacturing parameters may be controlled to produce an aerosol-forming rod formed having a cross-sectional porosity distribution value of between about 0.04 and about 0.22, as calculated using the method described above in which each sub-area is a square having a side length of one seventh of the rod diameter and in which each sub-area overlaps at least one other sub-area by about 80%.

Rods for use as aerosol-forming substrates in aerosol-forming articles may also be provided. For example, an aerosol-forming rod formed using a method described herein may have a cross-sectional porosity of between about 0.15 and 0.45, preferably between about 0.20 and 0.40, preferably between about 0.25 and about 0.35.

An aerosol-forming rod formed using a method described herein may have a cross-sectional porosity distribution value of between about 0.04 and about 0.22, as calculated using the method described above in which each sub-area is a square having a side length of one seventh of the rod diameter and in which each sub-area overlaps at least one other sub-area by about 80%.

The aerosol-forming rods may be used to make a heated aerosol-generating article. This method may comprise the steps of: forming a rod as described herein, and assembling the rod with a plurality of other components within a wrapper to form the heated aerosol-generating article.

Preferably the values of cross-sectional porosity and cross-sectional porosity distribution value of the rod are selected to provide a predetermined resistance to draw through the assembled heated aerosol-generating article.

The aerosol-forming substrate preferably comprises nicotine. The values of cross-sectional porosity and cross-sectional porosity distribution value may be selected to facilitate providing predetermined levels of nicotine delivery from the assembled heated aerosol-generating article when the article is consumed.

A heated aerosol-generating article may comprise a plurality of elements, including an aerosol-forming substrate in the form of an aerosol-forming rod as defined herein, the plurality of elements being assembled within a wrapper. Preferably the aerosol-forming substrate comprises nicotine and the cross-sectional porosity and cross-sectional porosity distribution value of the aerosol-forming substrate are selected to facilitate providing predetermined levels of nicotine delivery when the heated aerosol-generating article is consumed.

In preferred examples, a heated aerosol generating article may comprise a plurality of elements, including an aerosol-forming substrate assembled within a wrapper, the aerosol-forming substrate being in the form of an aerosol-forming rod having a diameter of between 6.5 mm and 8 mm, the rod formed from a crimped and gathered sheet of homogenised tobacco material, the sheet having a width of between 120 mm and 160 mm, a thickness of between 150 micrometers and 250 micrometers, and the sheet being crimped with a crimping depth of between 100 and 250 micrometers.

As used herein, the term 'aerosol-forming substrate' denotes a substrate consisting of or comprising an aerosol-forming material that is capable of releasing volatile compounds upon heating to generate an aerosol. A sheet of tobacco material is an example of an aerosol-forming substrate for the purposes of this specification. A sheet of paper or polymer comprising a nicotine salt is another example of an aerosol-forming substrate for the purposes of this specification.

In one embodiment, aerosol-forming rods as described herein may be used as aerosol-forming substrates in heated aerosol-generating articles comprising a heat source that abuts the aerosol-forming substrate rod, for example a combustible heat source and an aerosol-generating substrate downstream of the combustible heat source. In this case the aerosol-forming substrate is preferably a rod having a cross-sectional porosity of between about 0.20 and about 0.44, preferably between about 0.34 and about 0.44, and a cross-sectional porosity distribution value of between about 0.11 and about 0.15, as calculated using the method described herein.

For example, rods as described herein may be used as aerosol-generating substrates in heated aerosol-generating articles of the type disclosed in WO-A-2009/022232, which comprise a combustible carbon-based heat source, an aerosol-generating substrate downstream of the combustible heat source, and a heat-conducting element around and in contact with a rear portion of the combustible carbon-based heat source and an adjacent front portion of the aerosol-generating substrate. However, it will be appreciated that rods as described herein may also be used as aerosol-generating substrates in heated aerosol-generating articles comprising combustible heat sources having other constructions.

In another embodiment, aerosol-forming rods as described herein may be used as aerosol-generating substrates in heated aerosol-generating articles for use in electrically-operated aerosol-generating systems in which the aerosol-generating substrate of the heated aerosol-generating article is heated by an electrical heat source.

For example, rods as described herein may be used as aerosol-generating substrates in heated aerosol-generating articles of the type disclosed in WO2013/098405. Thus, the heated aerosol-generating article may be configured to be heated by an insertable heater of an aerosol-generating device. In this case, the aerosol-forming substrate is preferably a rod having a cross-sectional porosity of between about 0.20 and about 0.40, preferably between about 0.24 and about 0.34, and a cross-sectional porosity distribution value of between about 0.10 and about 0.12, as calculated using the method described herein.

A system may be provided comprising an electrically-operated aerosol-generating apparatus and an aerosol-generating article for use with the apparatus. The aerosol-generating article comprises a rod or an aerosol-forming substrate as described herein.

Preferably, rods according to the specification are of substantially uniform cross-section. Rods according to the specification may be produced having different dimensions depending upon their intended use. For example, rods according to the specification may have a length of between about 5 mm and about 30 mm depending upon their intended use. In preferred embodiments, rods according to the specification for use as aerosol-forming substrates in heated aerosol-generating articles may have a rod length of between about 5 mm and about 20 mm or between about 10 mm and about 15 mm.

Preferably the sheet of aerosol-forming material is a sheet of tobacco material comprising tobacco and an aerosol former. Tobacco material forming the sheet is preferably reconstituted tobacco or homogenised tobacco. Homogenised tobacco materials may include various other additives such as humectants, plasticisers, flavourants, fillers, binders and solvents. Suitable aerosol-formers and humectants for inclusion in sheets of homogenised tobacco material are known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

Sheets of homogenised tobacco material for use in forming rods as described herein may have an aerosol former content of between about 5% and about 30% by weight on a dry weight basis. Rods intended for use in heated smoking articles, wherein the aerosol-former containing rod is heated rather than combusted, may preferably include an aerosol former of greater than 5% to about 30%. For rods intended for use in such heat smoking articles, the aerosol former may preferably be glycerine.

Alternatively, the sheet of aerosol-forming material may be a non-tobacco sheet, such as a polymeric sheet or a paper sheet or a metallic sheet. In some embodiments, the sheet of aerosol-forming material may comprise at least one material selected from the group consisting of a metallic foil, a polymeric sheet, paper, and cardboard. In some embodiments, the sheet may comprise at least one material selected from the group consisting of polyethylene (PE), polypropylene (PP), polyvinylchloride (PVC), polyethylene terephthalate (PET), polylactic acid (PLA), cellulose acetate (CA), starch based copolyester, and aluminium foil. Preferably the sheet of non-tobacco material comprises one or more nicotine salt selected from the list consisting of nicotine citrate, nicotine pyruvate, nicotine bitartrate, nicotine pectates, nicotine aginates, nicotine salicylate, nicotine isovalerate, nicotine lactate, nicotine phenylacetate, and nicotine myristate. Nicotine in these salt forms may be more stable than liquid freebase nicotine typically used in e-cigarettes. Thus, aerosol-generating articles comprising the aerosol-generating rods may have longer shelf lives than typical e-cigarettes.

The sheet of aerosol-forming material, whether a tobacco sheet or a non-tobacco sheet, may be coated with a non-tobacco flavourant. The sheet may be impregnated with a non-tobacco flavourant.

The sheet of aerosol-forming material may be formed from a material such as a gel or hydrogel that incorporates a flavourant. The sheet may volatilise on heating to release the flavourant. The sheet may comprise a biodegradable polymer, for example the sheet may be a sheet of polylactic acid (PLA) that is coated or impregnated with a flavourant.

The flavourant may comprise a volatile flavour component. The flavourant may comprise menthol. As used herein, the term 'menthol' denotes the compound 2-isopropyl-5-methylcyclohexanol in any of its isomeric forms. The flavourant may provide a flavour selected from the group consisting of menthol, lemon, vanilla, orange, wintergreen, cherry, and cinnamon.

A sheet of aerosol-forming material comprising a non-tobacco flavourant may additionally comprise an aerosol-former such as glycerine. The aerosol-former may carry flavour components into an aerosol.

As used herein, the term 'rod' is used to denote a generally cylindrical element of substantially circular, oval or elliptical cross-section. Preferably the diameter of the rod is between 5 mm and 10 mm, preferably between 6 mm and 9 mm, or between 7 mm and 8 mm.

As used herein, the term 'sheet' denotes a laminar element having a width and length substantially greater than the thickness thereof. Preferably the sheet of aerosol forming material has a width of between 120 mm and 300 mm prior to being gathered, for example between 130 mm and 170 mm. Preferably the sheet of aerosol-forming material has a thickness of between 50 micrometers and 300 micrometers, preferably between 150 micrometers and 250 micrometers.

As used herein, the term 'rod length' denotes the dimension in the direction of the cylindrical axis of rods as described herein. The rod length may be between 5 mm and 20 mm, preferably between 8 mm and 15 mm.

As used herein, the term 'gathered' denotes that the sheet of aerosol-forming material is convoluted, folded, or otherwise compressed or constricted substantially transversely to the cylindrical axis of the rod.

As used herein, the term 'crimped sheet' is intended to be synonymous with the term 'creped sheet' and denotes a sheet having a plurality of substantially parallel ridges or corrugations. Preferably, the crimped sheet of aerosol-forming material has a plurality of ridges or corrugations substantially parallel to the cylindrical axis of the rod according to the invention. This advantageously facilitates gathering of the crimped sheet of homogenised tobacco material to form the rod. The sheet is crimped by passing it through a set of crimping rollers. The degree to which the sheet is crimped is denoted by a crimping depth. Variation in the crimping depth may affect the manner in which the sheet is gathered, and may therefore influence the size of the channels through the rod and the cross-sectional porosity distribution. Thus, crimping depth or amplitude is a parameter that may be varied to produce a desired cross-sectional porosity distribution value in a rod.

As used herein, the terms 'upstream' and 'downstream' are used to describe the relative positions of components, or portions of components, of aerosol-generating articles comprising rods as described herein in relation to the direction of air drawn through the aerosol-generating articles during use thereof.

SPECIFIC EMBODIMENTS OF THE INVENTION

Figure 2:
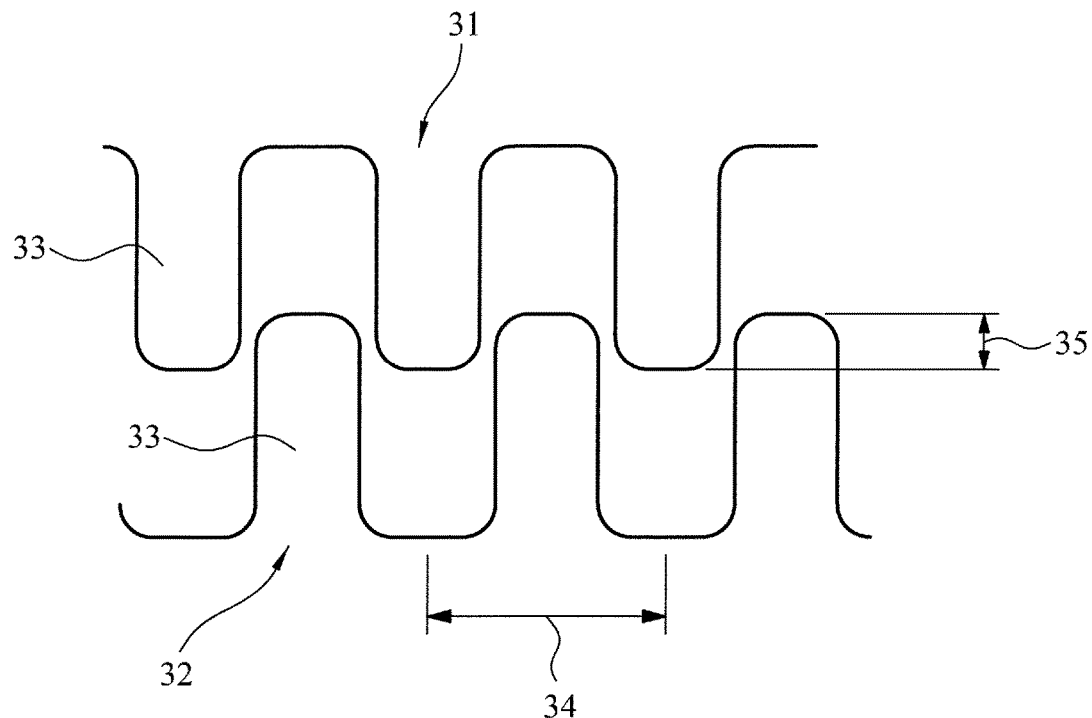
Figure 3:
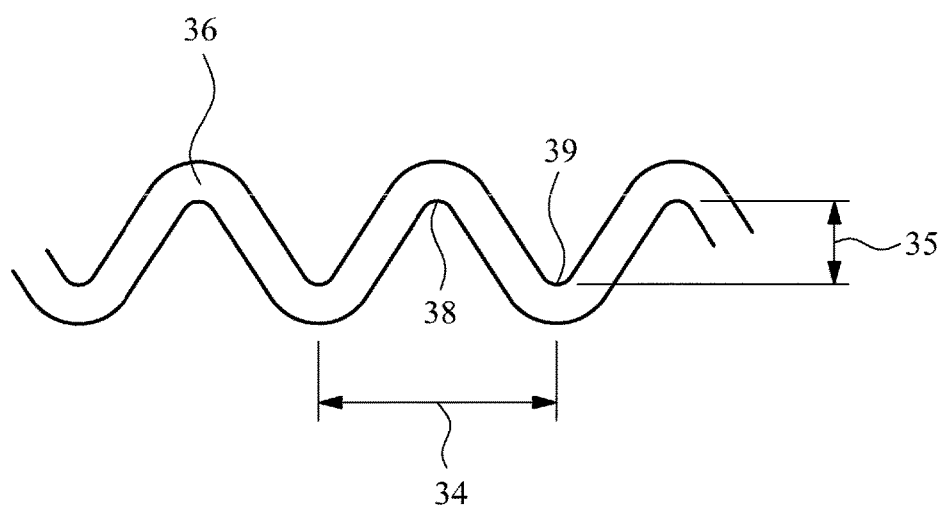
Figure 4:
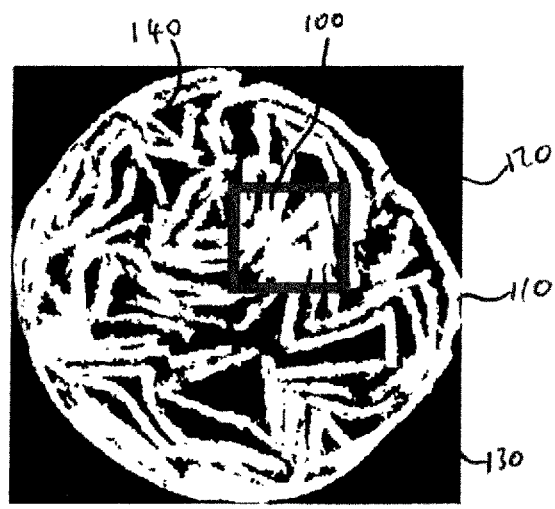
Figure 5:
Figure 6:
Figure 7:
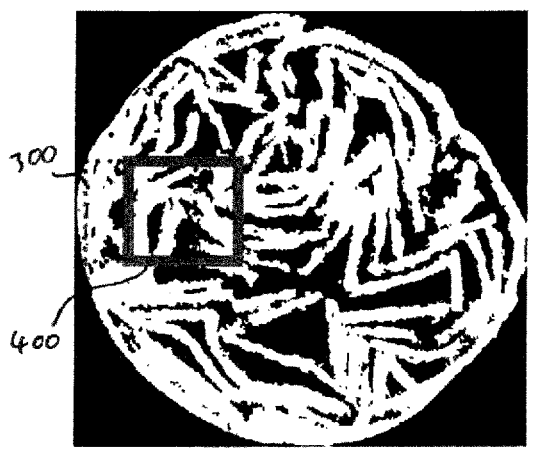
Figure 8:
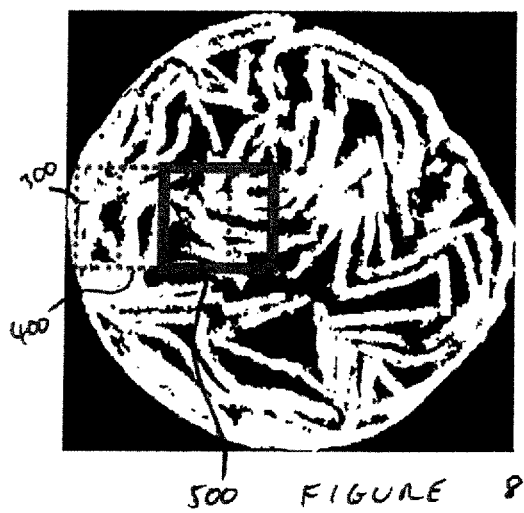
Figure 9:
Figure 10:
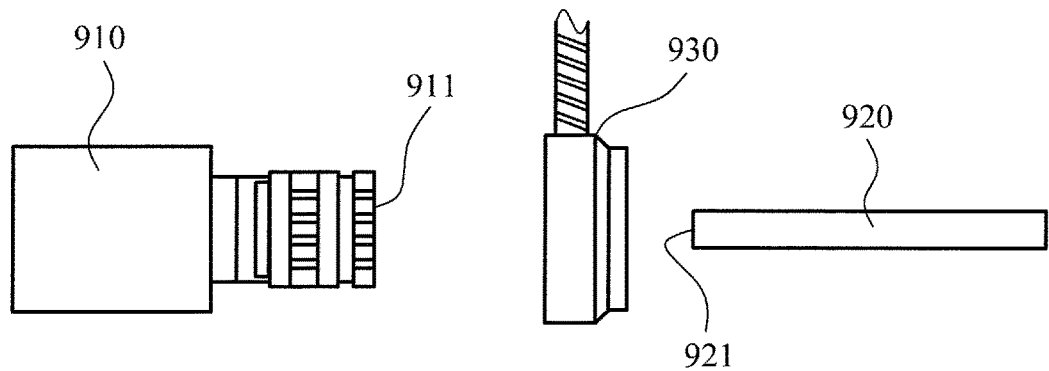
Figure 11:
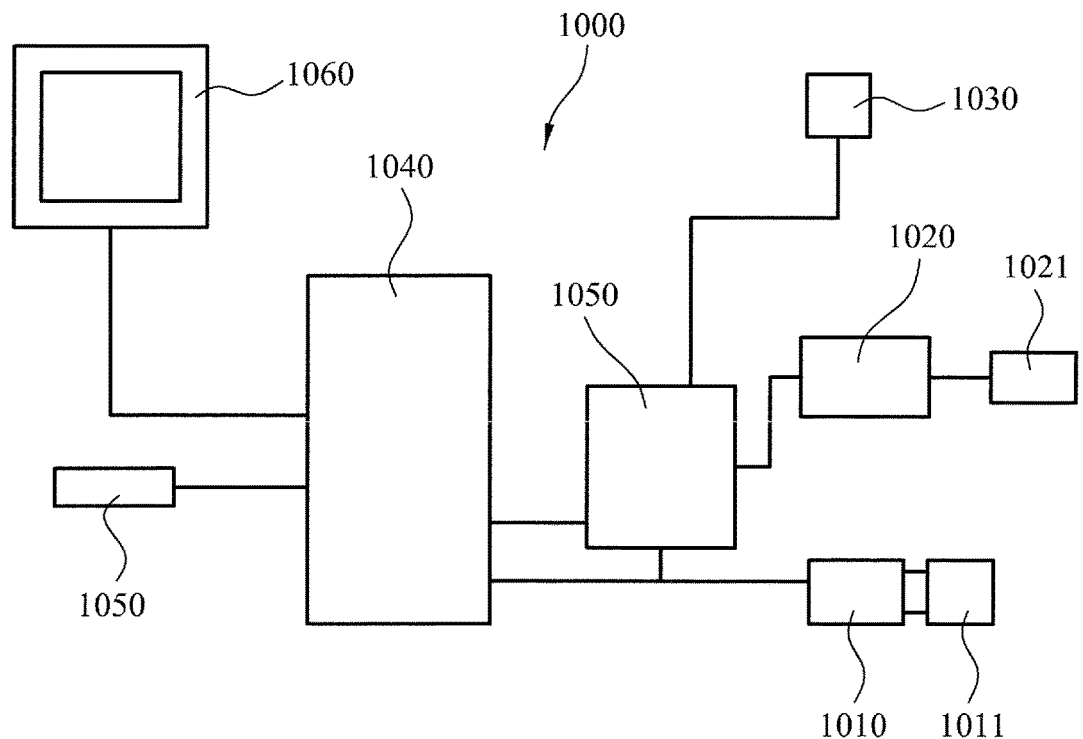
Figure 16:
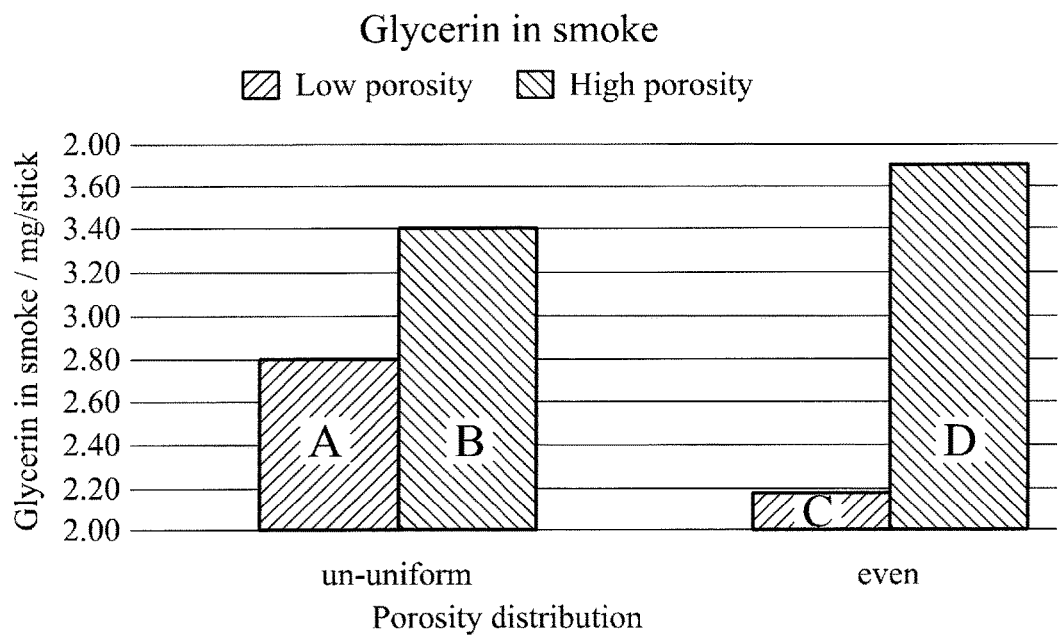
Figure 17:
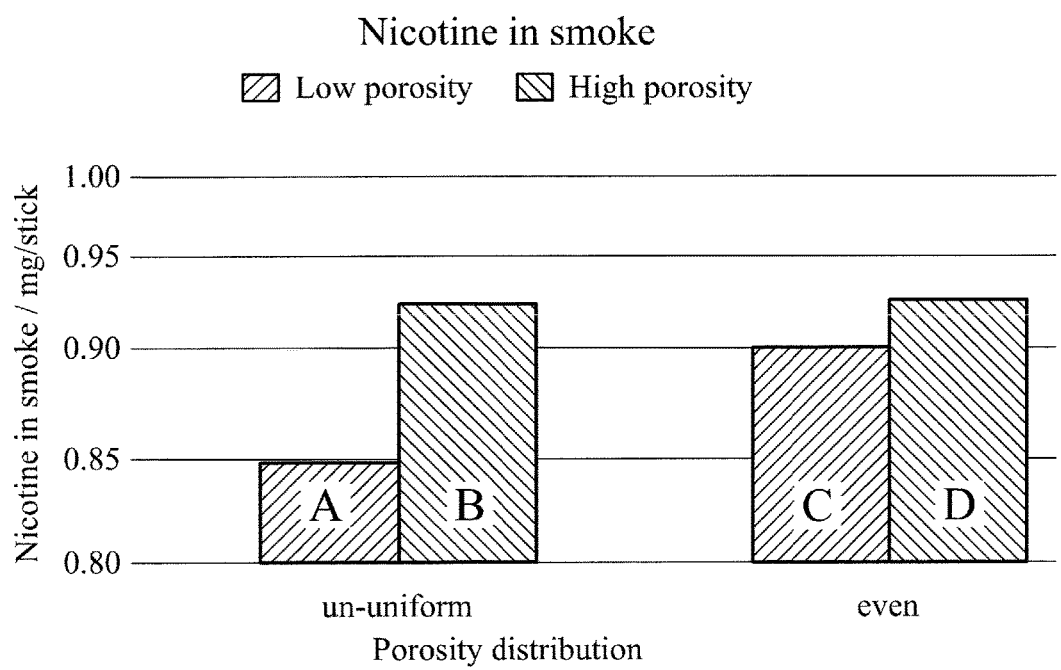
Figure 18:
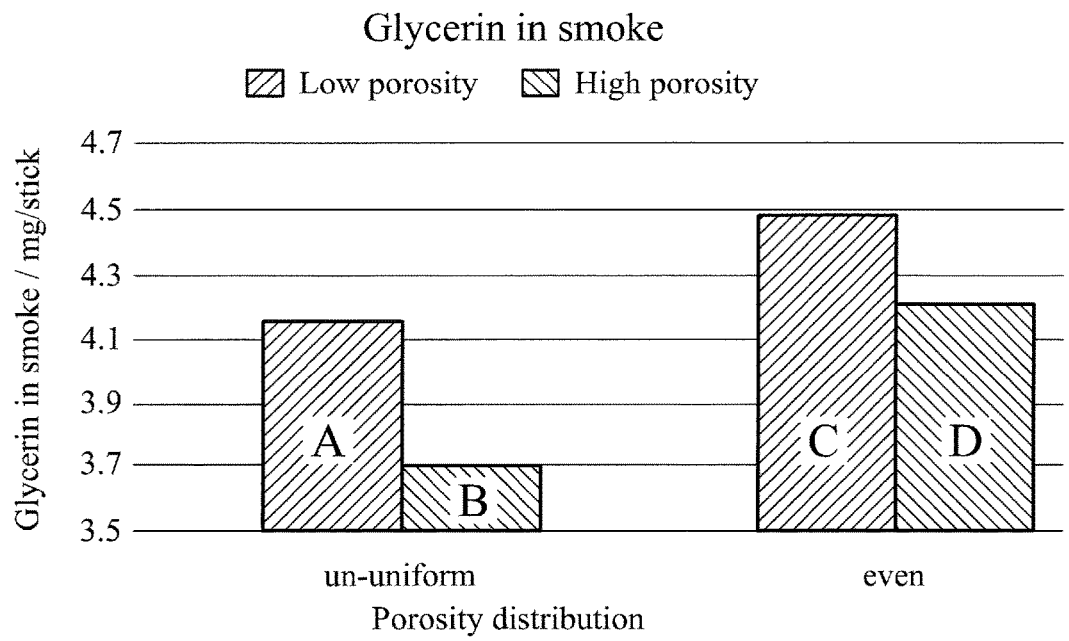
Figure 19:
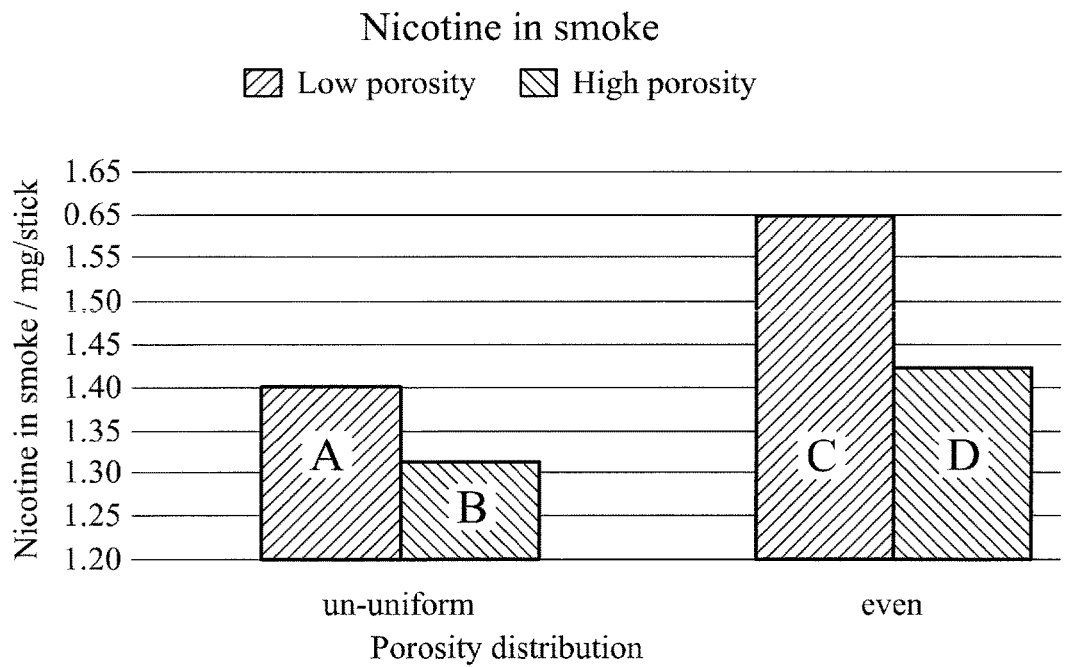
Figure 20:
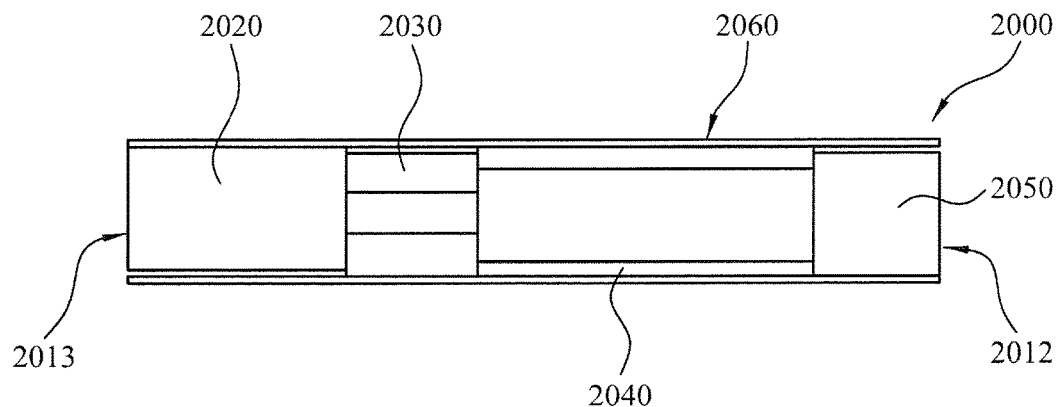
Figure 21:
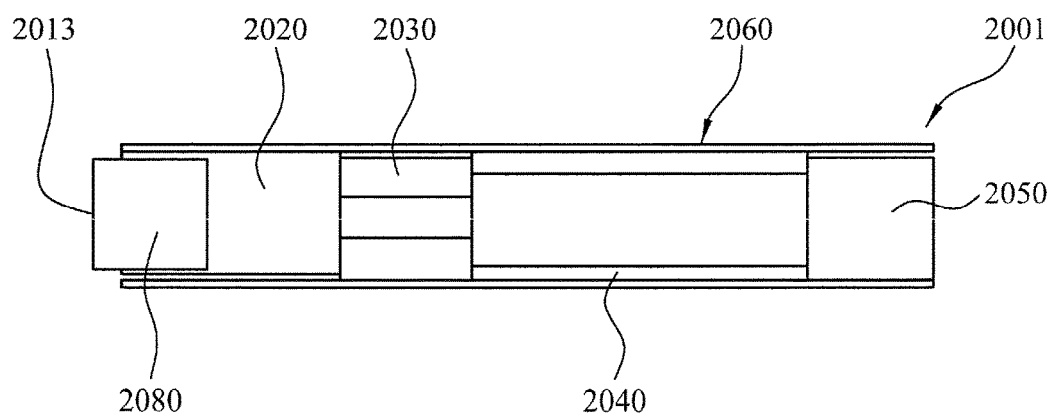
Figure 22:
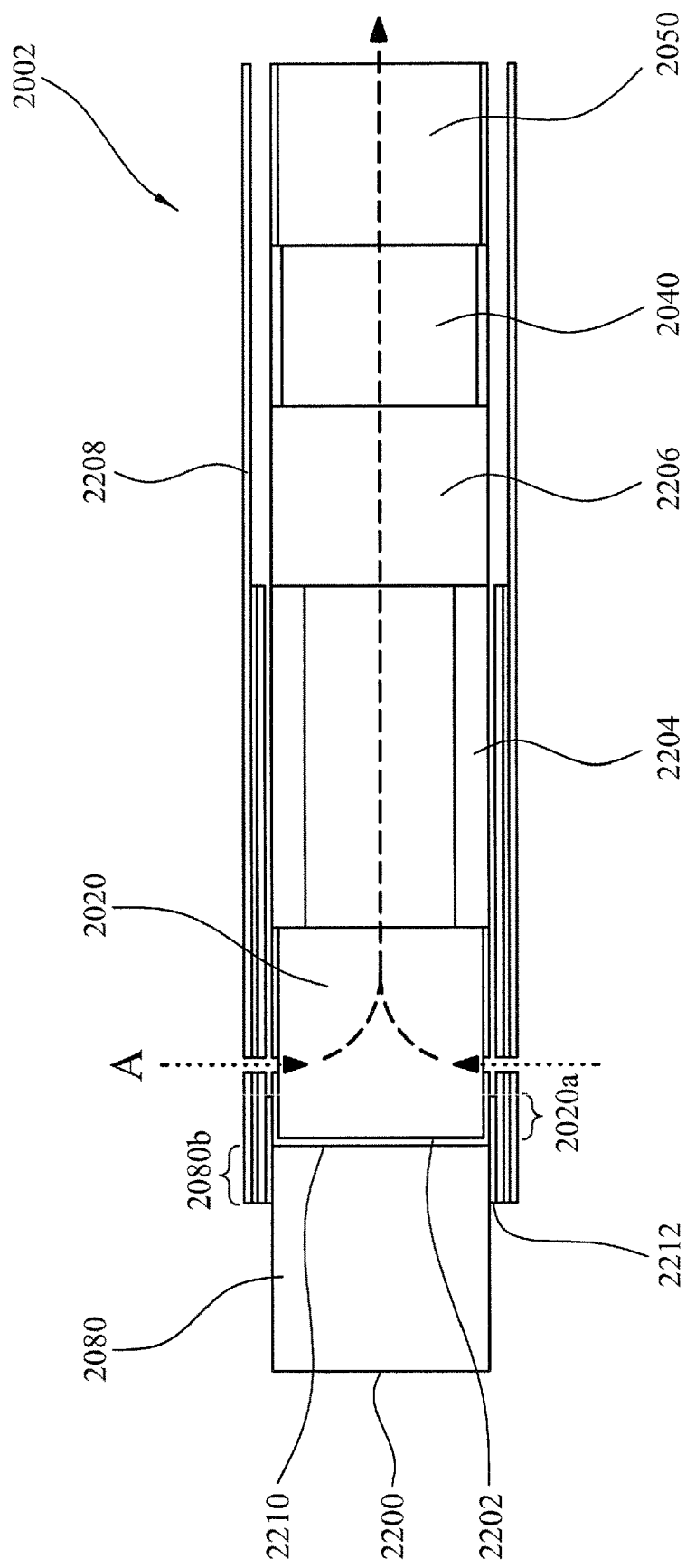

Specific embodiments of the invention will now be described with reference to the figures in which;

FIG. 1 shows a schematic cross-section of apparatus for forming a rod according to the invention, FIG. 2 is a schematic illustration showing intermeshing of teeth on a crimping roller, FIG. 3 is a schematic illustration showing a portion of a crimped sheet, FIG. 4 is an image of a transverse area of a porous tobacco rod; the image is shown with a sub-area superimposed, FIG. 5 is the transverse area of the tobacco rod illustrated in FIG. 4 showing a sub-area in a different portion of the transverse area, FIG. 6 is an image illustrating the transverse area of FIG. 4 and showing a sub-area in a third different portion of the transverse area, FIG. 7 illustrates the extent to which the sub-area of FIG. 6 is overlapped by a further sub-area, FIG. 8 illustrates the extent to which a further sub-area overlaps the sub-areas of FIG. 7, FIG. 9 illustrates the transverse area of FIG. 4 which shows a sub-area positioned so that most of the sub-area is not within the transverse area, FIG. 10 is a schematic illustration of an image capture means in an online porosity distribution evaluation, FIG. 11 is a schematic diagram illustrating the components of a device for performing an online porosity distribution evaluation, FIG. 12 is a photograph of a tobacco rod having a low cross-sectional porosity (lower than 0.3) and high cross-sectional porosity distribution value (higher than 0.15), FIG. 13 illustrates cross-sectional area of a rod having a high global porosity (greater than 0.3) and a high cross-sectional porosity distribution value (higher than 0.15), FIG. 14 illustrates the cross-sectional area of a rod having low cross-sectional porosity (less than 0.3) and low porosity distribution (less than 0.15), FIG. 15 illustrates the cross-sectional area of a rod having high global porosity (greater than 0.3) and low cross-sectional porosity distribution value (less than 0.15), FIG. 16 illustrates the glycerine in smoke generated for aerosol-generating articles comprising rods having different levels of cross-sectional porosity and cross-sectional porosity distribution, FIG. 17 illustrates the nicotine in smoke for the same for aerosol-generating articles as in FIG. 16, FIG. 18 illustrates glycerine in smoke generated for aerosol-generating articles comprising rods having different levels of cross-sectional porosity and cross-sectional porosity distribution, FIG. 19 illustrates the nicotine in smoke for the same for aerosol-generating articles as in FIG. 18, FIG. 20 illustrates an embodiment of an aerosol-generating article having an aerosol-forming substrate formed as a rod according to a method described herein, FIG. 21 illustrates an embodiment of an aerosol-generating article having an aerosol-forming substrate formed as a rod according to a method described herein, and FIG. 22 illustrates an embodiment of an aerosol-generating article having an aerosol-forming substrate formed as a rod according to a method described herein.

A specific embodiment of the invention will now be described with reference to a method for evaluating porosity distribution within an aerosol-forming rod in the form of a tobacco plug.

FIG. 1 illustrates an apparatus used to form rods according to a specific embodiment of the invention. FIG. 1 generally comprises: supply means for providing a continuous sheet of homogenised tobacco material; crimping means for crimping the continuous sheet of homogenised tobacco material; rod forming means for gathering the continuous crimped sheet of homogenised tobacco material and circumscribing the gathered continuous crimped sheet of homogenised tobacco material with a wrapper to form a continuous rod; and cutting means for severing the continuous rod into a plurality of discrete rods. The apparatus also comprises transport means for transporting the continuous sheet of homogenised tobacco material downstream through the apparatus from the supply means to the rod forming means via the crimping means.

The supply means comprises a continuous sheet of homogenised tobacco material 2 mounted on a bobbin 4 and the crimping means comprises a pair of rotatable crimping rollers 6. The continuous sheet of homogenised tobacco material has a width and a thickness. In use, the continuous sheet of homogenised tobacco material 2 is drawn from the bobbin 4 and transported downstream to the pair of crimping rollers 6 by the transport mechanism via a series of guide and tensioning rollers. As the continuous sheet of homogenised tobacco material 2 is fed between the pair of crimping rollers 6, the crimping rollers engage and crimp the continuous sheet of homogenised tobacco material 2 to form a continuous crimped sheet of homogenised tobacco material 8 having a plurality of spaced-apart ridges or corrugations substantially parallel to the longitudinal axis of the sheet of homogenised tobacco material through the apparatus.

FIG. 2 is a schematic illustration showing intermeshing teeth of a pair of crimping rollers. The pair of crimping rollers consists of an upper roller 31 and a lower roller 32. Each roller has a set of regularly spaced crimping teeth 33 that are offset such that they intermesh when the rollers are brought together. The upper roller 31 is fixed, but the lower roller 32 may be moved relative to the upper roller 31 so as to alter the crimping depth or crimping amplitude. The teeth are spaced with a crimping period 34, which in the specific example is 1 mm. The crimping depth 35 is the distance that the tips of the crimping teeth overlap by when the rollers are meshed. The crimping depth may be set to a predetermined depth, for example 150 micrometers.

FIG. 3 illustrates a section of crimped sheet 36. The crimping period 34 and the crimping depth 35 are shown on the crimped sheet 36. The crimping depth 35 is measured from the inside of one corrugation to the inside of the next corrugation 39.

The continuous crimped sheet of homogenised tobacco material 8 is transported downstream from the pair of crimping rollers 6 to the rod forming means by the transport mechanism where it is fed through a converging funnel or horn 10. The converging funnel 10 gathers the continuous crimped sheet of homogenised tobacco material 8 transversely relative to the longitudinal axis of the sheet of homogenised tobacco material. The continuous crimped sheet of homogenised tobacco material 8 assumes a substantially cylindrical configuration as it passes through the converging funnel 10.

Upon exiting the converging funnel 10, the gathered continuous crimped sheet of homogenised tobacco material is wrapped in a continuous sheet of wrapping material 12. The continuous sheet of wrapping material is fed from a bobbin 14 and enveloped around the gathered continuous crimped sheet of homogenised tobacco material by an endless belt conveyor or garniture. As shown in FIG. 1, the rod forming means comprises an adhesive application means 16 that applies adhesive to one of the longitudinal edges of the continuous sheet of wrapping material, so that when the opposed longitudinal edges of the continuous sheet of wrapping material are brought into contact they adhere to one other to form a continuous rod.

The rod forming means further comprises a drying means 18 downstream of the adhesive application means 16, which in use dries the adhesive applied to the seam of the continuous rod as the continuous rod is transported downstream from the rod forming means to the cutting means.

The cutting means comprises a rotary cutter 20 that severs the continuous rod into a plurality of discrete rods of unit length or multiple unit length.

In a preferred embodiment the discrete rods have a diameter of about 7 mm. The sheet width, sheet thickness, and crimping depth are selected to give a predetermined cross-sectional porosity falling within the range of 0.15 to 0.45 and a cross-sectional porosity distribution value of between 0.05 and 0.22. The cross-sectional porosity distribution value is a measure of the uniformity of the porosity in the rod.

FIG. 4 illustrates an end face of a tobacco plug 110 formed by a process of crimping and gathering a sheet of homogenised tobacco material as described above. The image of FIG. 4 is a digital image which has been processed such that all white pixels correspond to tobacco 120, black pixels outside the outer circumference of the rod 130 relate to the background, and black pixels within the circumference of the plug 140 correspond to pores or voids. The image is obtained by taking an image of the end face of the tobacco plug and digitally processing the image of the transverse area of the plug to identify pixels that are within the transverse area of the rod. A threshold is then applied to the image such that pixels within the transverse area are either white, representing tobacco material, or black, representing pores. In FIG. 4, the tobacco plug is substantially circular and has a diameter of about 7 mm. The entire area within the outer circumference of the tobacco plug is the transverse cross-sectional area. FIG. 4 illustrates a first sub-area 100 positioned within the transverse area. The first sub-area is a rectangular area having dimensions of 1 mm by 1 mm. Thus, the sides of the sub-area are about one seventh of the diameter of the rod.

Porosity within the area of the rod is the transverse cross-sectional porosity. The transverse cross-sectional porosity is calculated according to the equation: $P_o = N_{void}/N_{tot}$ where $P_o$ is the overall porosity of the transverse cross-sectional area, $N_{void}$ is the number of pixels representing void space within the transverse cross-sectional area and $N_{tot}$ is the total number of pixels in transverse cross-sectional area.

Porosity within a sub-area is termed local porosity. In FIG. 4, the first sub-area 100 is illustrated in a position where the local porosity is low. In other words, the pore area (the black pixels within the first sub-area 100 of FIG. 4) is small compared to the overall area of the first sub-area (1 mm$^2$).

FIG. 5 illustrates the same transverse cross-sectional area that is illustrated in FIG. 4. FIG. 5 shows a second sub-area 200 positioned in a region having a higher local porosity, as reflected by the higher pore area within the corresponding sub-area. Different sub-areas positioned in different regions of the transverse area will have different values of local porosity. By evaluating local porosity for multiple sub-areas within the transverse area, it is possible to obtain a value indicative of cross-sectional porosity distribution.

The cross-sectional porosity distribution value is obtained by computing the local porosity in each of the plurality of sub-areas. For each individual tobacco sub-area, the local porosity of a sub-area of the image is calculated. Local porosity may be calculated by the formula $P_l = N_{voidlocal}/N_{local}$ where $P_l$ is the local porosity within the sub-area, $N_{voidlocal}$ is the number of pixels representing void space within the sub-area, and $N_{local}$ is the total number of pixels in the sub-area. Sub-areas are applied to and translated across the digital image of the rod by an iteration algorithm embodied in software. In order to obtain the plurality of local porosity readings, a sub-area is effectively translated through the image sequentially, and the local porosity calculated in each position that the sub-area occupies. Each position that the sub-area occupies overlaps with at least one other position occupied by the sub-area. This process is illustrated in FIGS. 6 to 9.

FIG. 6 illustrates the transverse area of the tobacco plug with a third sub-area 300 superimposed on a left side of the plug. The local porosity is calculated in this sub-area. Then the sub-area is translated to the right across the transverse area. FIG. 7 illustrates a fourth sub-area 400 superimposed on the digital image of the tobacco plug. FIG. 7 also shows (in dotted lines) the position of the third sub-area 300. It can be seen that the fourth sub-area 400 overlaps with the position of the third sub-area 300. The overlap is 80%. The local porosity is calculated in the fourth sub-area and the sub-area is again translated across the transverse area. FIG. 8 illustrates the transverse area showing a fifth sub-area 500.

FIG. 8 also shows (in dotted lines) positions of the third 300 and fourth 400 sub-areas. A local porosity value is obtained for the fifth sub-area 500 and the sub-area is translated once more through the structure. This proceeds until all pixels within the structure have been included in one or more sub-areas.

In the specific example described here, the local porosity within a sub-area is only calculated if at least 90% of the pixels within the sub-area are also inside the transverse area. FIG. 9 illustrates the transverse area of the tobacco plug and shows a sixth sub-area 600 superimposed on the digital image. Fewer than 90% of the pixels of the sixth sub-area 600 lie within the transverse area, i.e. the area within the tobacco plug. Thus, the local porosity is not calculated with respect to the sixth sub-area. This is to avoid local porosity being calculated for sub-areas in which there is not a high enough area for the local porosity to be representative of the local tobacco structure.

Computed values of local porosity for each sub-area are stored in an array. The average value and standard deviation of the local porosity can then be calculated for the tobacco plug. The standard deviation of the local porosity can be used as a measure of the width of the porosity distribution, and defines the cross-sectional porosity distribution value. This gives a quantitative value of how uniform the tobacco is distributed in the plug. A low standard deviation indicates a plug with uniform tobacco distribution, whereas a high standard deviation indicates a non-uniform plug.

It is noted that the digital image acquisition may be done by any suitable method, for example by using digital cameras or computer tomography. The images may be represented by any suitable image format in full RGB (red-green-blue) colour, grey-scale, or binary (black and white) representations. Preferably the background in any image is uniform to facilitate the detection and removal of the background during image processing. The resolution of any image should be high enough to accurately resolve the morphology of the tobacco plug.

The results from the porosity evaluation as described above may then be used to control the process for the manufacture of the rods to ensure that the predetermined values of cross-sectional porosity and cross-sectional porosity distribution value are being achieved. Thus, the method for evaluating porosity may provide feedback as to when process parameters are set so as to produce porous rods that are out of specification and allow the process parameters to be corrected to produce porous rods that are within allowable specification.

A device for evaluating porosity and porosity distribution of a tobacco plug formed from a gathered sheet of tobacco material may be integrated as part of the manufacture line. A device for evaluating the porosity distribution requires an image capturing means, such as a digital camera, and a processor for performing the required processing steps to analyze a digital image obtained of the rod. The device preferably further includes a light source for illuminating the rod.

FIG. 10 illustrates a configuration of an image capturing means in which a camera 910 is arranged to capture a digital image of the end face 921 of a tobacco rod 920. The tobacco rod 920 is formed by crimping and gathering a sheet of homogenised tobacco material and circumscribing the gathered sheet with a wrapper to produce a rod. The lens 911 of the camera 910 is set to be a predetermined distance from the end face 921 of the tobacco rod 920.

In order to provide an even illumination of the end face 921 of the tobacco rod 920 a ring light 930, for example a Schott Ring Light A08660, is disposed between the camera lens 911 and the tobacco rod 920. The ring light 930 is preferably positioned closer to the tobacco rod 920 than the camera lens 911.

FIG. 11 illustrates a device or system 1000 for evaluating porosity distribution of a porous rod, such as a tobacco rod. The device or system 1000 comprises a digital camera 1010 having a lens 1011, and a light source 1020 coupled to a ring light 1021. The shutter of the camera is controlled by means of a sensor 1030 that can detect the position of porous rods. Processing of the digital image obtained by the camera 1010 is performed by a processor within a PC 1040. The sensor, the light source, the camera, and the PC are linked together by a controller 1050. The PC further comprises a keyboard 1050 and a monitor 1060. A system or device having the components illustrated in FIG. 10 may be incorporated into a rod manufacture apparatus to evaluate the porosity distribution in rods in real time as they are formed.

For a given diameter of rod, variations in the cross-sectional porosity and the cross-sectional porosity distribution value affect the delivery of various aerosol components when the rod is heated. Rods were produced having (1) low cross-sectional porosity and non-uniform cross-sectional porosity distribution, (2) low cross-sectional porosity and uniform cross-sectional porosity distribution, (3) high cross-sectional porosity and non-uniform cross-sectional porosity distribution, and (4) high cross-sectional porosity and uniform cross-sectional porosity distribution. Cross-sectional images of these four different rods are illustrated in FIGS. 12 to 15.

The rod illustrated in FIG. 12 (rod A) has a diameter of 7 mm. The rod is formed from a crimped and gathered sheet of homogenised tobacco material. Prior to crimping, the sheet had a width of 150 mm and a thickness of 200 microns. The sheet was crimped to a crimping depth or crimping amplitude of 100 micrometers. Image analysis using the method described above indicated that the transverse cross-sectional porosity was low (less than 0.30) and the cross-sectional porosity distribution value was high (about 0.18) (i.e., the rod had low cross-sectional porosity and non-uniform cross-sectional porosity distribution). It can be seen that the rod has regions in which layer upon layer of tobacco sheet material lie directly on one another and other regions that are large voids.

The rod illustrated in FIG. 13 (rod B) has a diameter of 7 mm. The rod is formed from a crimped and gathered sheet of homogenised tobacco material. Prior to crimping, the sheet had a width of 132 mm and a thickness of 200 microns. The sheet was crimped to a crimping depth or crimping amplitude of 100 micrometers. Image analysis using the method described above indicated that the transverse cross-sectional porosity was high (greater than 0.30) and the cross-sectional porosity distribution value was high (about 0.19) (i.e., the rod high cross-sectional porosity and non-uniform cross-sectional porosity distribution). The structure of the rod is similar to that illustrated in FIG. 12, but slightly more open.

The rod illustrated in FIG. 14 (rod C) has a diameter of 7 mm. The rod is formed from a crimped and gathered sheet of homogenised tobacco material. Prior to crimping, the sheet had a width of 150 mm and a thickness of 200 microns. The sheet was crimped to a crimping depth or crimping amplitude of 170 micrometers. Image analysis using the method described above indicated that the transverse cross-sectional porosity was low (less than 0.30) and the cross-sectional porosity distribution value was low (about 0.08) (i.e., the rod had low cross-sectional porosity and uniform cross-sectional porosity distribution). The rod is densely packed with tobacco and the pores are small and evenly distributed.

The rod illustrated in FIG. 15 (rod D) has a diameter of 7 mm. The rod is formed from a crimped and gathered sheet of homogenised tobacco material. Prior to crimping the sheet had a width of 1132 mm and a thickness of 200 microns. The sheet was crimped to a crimping depth or crimping amplitude of 190 micrometers. Image analysis using the method described above indicated that the transverse cross-sectional porosity was high (greater than 0.30) and the cross-sectional porosity distribution value was low (about 0.10) (i.e., the rod had high cross-sectional porosity and uniform cross-sectional porosity distribution). While evenly distributed, the pores are slightly larger than those in the rod of FIG. 14.

Rods of each of the type rod A to rod D (as illustrated in FIGS. 12 to 15 were formed into aerosol-generating articles similar to the type illustrated in FIG. 21 and heated by means of burning a combustible heating element incorporated in the article. Measurements were made of the glycerine levels and the nicotine levels in the aerosol that was generated. Glycerine levels were determined according to CORESTA recommended method No. 60. Nicotine levels were determined according to ISO10315. Results of these experiments are shown in FIGS. 16 and 17.

It can be seen that the primary factor influencing both glycerine and nicotine delivery is that the rod has high porosity. The delivery values are slightly improved if the rod also has a uniform porosity.

Rods of each of the type rod A to rod D (as illustrated in FIGS. 12 to 15 were also formed into aerosol-generating articles similar to the type illustrated in FIG. 20 and heated using a heating element that was inserted into the rod to generate an aerosol. Measurements were made of the glycerine levels and the nicotine levels in the aerosol that was generated. Glycerine levels were determined according to CORESTA recommended method No. 60. Nicotine levels were determined according to ISO10315. Results of these experiments are shown in FIGS. 18 and 19.

It can be seen that the primary factor influencing both glycerine and nicotine delivery for this type of heated aerosol-generating article is that the rod has high uniformity. Furthermore, the results are improved under conditions of low porosity and high uniformity.

FIG. 20 illustrates an embodiment of an aerosol-generating article 2000 comprising a rod as described herein. An aerosol-generating article 2000 as illustrated in FIG. 20 is designed to engage with an aerosol-generating device in order to be consumed. Such an aerosol-generating device includes means for heating the aerosol-forming substrate 2020 to a sufficient temperature to form an aerosol. Typically, the aerosol-generating device may comprise a heating element that surrounds the aerosol-generating article 2000 adjacent to the aerosol-forming substrate 2020, or a heating element that is inserted into the aerosol-forming substrate 2020.

Once engaged with an aerosol-generating device, a user draws on the mouth-end 2012 of the smoking article 2000 and the aerosol-forming substrate 2020 is heated to a temperature of about 375 degrees Celsius. At this temperature, volatile compounds are evolved from the homogenised tobacco forming the aerosol-forming substrate 2020. These compounds condense to form an aerosol. The aerosol is drawn through the filter 2050 and into the user's mouth.

The article 2000 comprises four elements; an aerosol-forming substrate 2020, a hollow cellulose acetate tube 2030, a spacer element 2040, and a mouthpiece filter 2050. These four elements are arranged sequentially and in coaxial alignment and are assembled by a cigarette paper 2060 to form the aerosol-generating article 2000. The article 2000 has a mouth-end 2012, which a user inserts into his or her mouth during use, and a distal end 2013 located at the opposite end of the article to the mouth end 2012.

When assembled, the article 2000 is about 45 millimeters in length and has an outer diameter of about 7.2 millimeters and an inner diameter of about 6.9 millimeters.

The aerosol-forming substrate 2020 comprises a rod having a cross-sectional porosity of about 0.22 and a cross-sectional porosity distribution value (measured using methods described herein) of 0.08 so as to optimise nicotine and glycerine delivery for this type of heated aerosol-generating article.

FIG. 21 illustrates a further embodiment of an aerosol-generating article 2001. While the article of FIG. 20 is intended to be consumed in conjunction with an aerosol-generating device, the article of FIG. 21 comprises a combustible heat source 2080 that may be ignited and transfer heat to the aerosol-forming substrate 2020 to form an inhalable aerosol. The combustible heat source 2080 is a charcoal element that is assembled in proximity to the aerosol-forming substrate at a distal end 2013 of the article 2001. Elements that are essentially the same as elements in FIG. 20 have been given the same numbering. The aerosol-forming substrate is a rod of homogenised tobacco having a cross-sectional porosity of about 0.30 and a cross-sectional porosity distribution value (measured using methods described herein) of about 0.12 so as to optimise nicotine and glycerine delivery for this type of heated aerosol-generating article.

FIG. 22 illustrates a yet further embodiment of an aerosol-generating article 2002. The smoking article 2002 is similar to that shown in FIG. 21, and comprises combustible heat source 2080 that may be ignited and transfer heat to the aerosol-forming substrate 2020 to form an inhalable aerosol. The aerosol-forming substrate is a rod as described herein. The combustible heat source 2080 is a blind combustible heat source having a front face 2200 and an opposed rear face 2202, an aerosol-forming substrate 2020, a transfer element 2204, an aerosol-cooling element 2206, a spacer element 2040 and a mouthpiece 2050 in abutting coaxial alignment. As used herein, the term 'blind' is used to describe a combustible heat source that does not include any airflow channels extending from the front face to the rear face of the combustible heat source. Elements that are essentially the same as elements in FIGS. 20 and 21 have been given the same numbering.

As shown in FIG. 22, the aerosol-forming substrate 2020, transfer element 2204, aerosol-cooling element 2206, spacer element 2040 and mouthpiece 2050 and a rear portion of the blind combustible heat source 2080 are wrapped in an outer wrapper 2208 of sheet material such as, for example, cigarette paper, of low air permeability.

The blind combustible heat source 2080 is a blind carbonaceous combustible heat source and is located at the distal end of the smoking article. A non-combustible substantially air impermeable first barrier 2210 in the form of a disc of aluminium foil is provided between the rear face 2202 of the blind combustible heat source 2080 and the aerosol-forming substrate 2020. The first barrier 2210 is applied to the rear face 2202 of the blind combustible heat source 2080 by pressing the disc of aluminium foil onto the rear face 2202 of the blind combustible heat source 2080 and abuts the rear face 2202 of the combustible carbonaceous heat source 2080 and the aerosol-forming substrate 2080.

As shown in FIG. 22, the smoking article 2002 further comprises a first heat-conducting element 2212 of suitable material such as, for example, aluminium foil, around and in direct contact with a rear portion 2080b of the blind combustible heat source 2080 and a front portion 2020a of the aerosol-forming substrate 2020. In the smoking article 2002 the aerosol-forming substrate 2020 extends downstream beyond the first heat-conducting element 2212. That is, the first heat-conducting element 2212 is not around and in direct contact with a rear portion of the aerosol-forming substrate 2020.

As can be seen, one or more air inlets are provided around the periphery of the aerosol-forming substrate, corresponding to A in FIG. 22.

It is noted that the specific embodiments described herein relate to rods formed from a sheet of tobacco material, but it should be clear to the skilled person that a similar method may be used to form rods from non-tobacco aerosol-forming materials. It is further noted that the specific embodiments described herein relate to rods formed from a crimped sheet of material, but it should be clear to the skilled person that a similar method may be used to form rods from untreated sheets of material, or from sheets that have been treated in a manner other than crimping.

The invention claimed is:

1. A method of making aerosol-forming rods having predetermined values of cross-sectional porosity and a cross-sectional porosity distribution value for use as aerosol-forming substrates in heated aerosol-generating articles, the method comprising:
   providing a continuous sheet of aerosol-forming material having a specified width and a specified thickness;
   gathering the continuous sheet transversely relative to a longitudinal axis thereof;
   circumscribing the gathered continuous sheet with a wrapper to form a continuous rod;
   severing the continuous rod into a plurality of discrete rods;
   determining values of cross-sectional porosity and cross-sectional porosity distribution for at least one of the discrete rods; and
   controlling one or more manufacturing parameters to ensure that the cross-sectional porosity and cross-sectional porosity distribution values of subsequent rods are within the predetermined values.

2. The method according to claim 1, further comprising crimping the continuous sheet before the step of gathering the continuous sheet.

3. The method according to claim 1, wherein the one or more manufacturing parameters is selected from a list consisting of the width of the continuous sheet of aerosol-forming material, the thickness of the continuous sheet of aerosol-forming material, a diameter of the continuous rod, a width of crimping applied to the continuous sheet of aerosol-forming material, and a depth of crimping applied to the continuous sheet of aerosol-forming material.

4. The method according to claim 1, wherein the determining the values of cross-sectional porosity and cross-sectional porosity distribution for at least one of the discrete rods further comprises, if the determined values are not within the predetermined values, varying the one or more manufacturing parameters to change the values of cross-sectional porosity and cross-sectional porosity distribution in the subsequent rods to provide the aerosol-forming rods having the predetermined values.

5. The method according to claim 1, wherein the continuous sheet of aerosol-forming material is a sheet of tobacco material comprising tobacco and an aerosol former.

6. The method according to claim 1, wherein the continuous sheet of aerosol-forming material is a non-tobacco material comprising a nicotine salt.

7. The method according to claim 1, wherein a diameter of the aerosol-forming rods is between 5 mm and 10 mm.

8. The method according to claim 1, wherein the specified width of the continuous sheet of aerosol forming material is between 70 mm and 250 mm.

9. The method according to claim 1, wherein the specified thickness of the continuous sheet of aerosol-forming material is between 50 µm and 300 µm.

10. The method according to claim 1, wherein the continuous sheet of aerosol-forming material is a crimped sheet of aerosol-forming material and has a crimping depth of between 50 µm and 300 µm.

11. The method according to claim 1,
    wherein the cross-sectional porosity distribution value is determined by obtaining a digital image of a transverse cross-sectional area of the continuous rod, determining an area fraction of voids present within each of a plurality of identically dimensioned sub-areas of the transverse cross-sectional area, thereby obtaining a porosity value for said each of the plurality of identically dimensioned sub-areas, and calculating a standard deviation of the porosity value for said each of the plurality of identically dimensioned sub-areas, and
    wherein each sub-area of the plurality of identically dimensioned sub-areas overlaps at least one adjacent sub-area of the plurality of identically dimensioned sub-areas by between 10% and 95%.

12. The method according to claim 11, wherein the continuous rod has a diameter and said each sub-area of the plurality of identically dimensioned sub-areas is a rectangle or a square with a length of between a quarter and an eighth of the diameter of the continuous rod.

13. The method according to claim 1,
    wherein the cross-sectional porosity distribution value is determined by obtaining a digital image of a transverse cross-sectional area of the continuous rod, determining an area fraction of voids present within each of a plurality of identically dimensioned sub-areas of the transverse cross-sectional area, thereby obtaining a porosity value for said each of the plurality of identically dimensioned sub-areas, and calculating a standard deviation of the porosity value for said each of the plurality of identically dimensioned sub-areas, and
    wherein each sub-area of the plurality of identically dimensioned sub-areas overlaps at least one adjacent sub-area of the plurality of identically dimensioned sub-areas by about 80%.

14. The method according to claim 11, wherein the porosity value of any individual sub-area of the plurality of identically dimensioned sub-areas is included in the calculating for determining the cross-sectional porosity distribution value if more than 90% of said individual sub-area is within the transverse cross-sectional area of the continuous rod.

15. The method according to claim 11, wherein the digital image of the transverse cross-sectional area consists of a plurality of pixels, and each pixel of said plurality that makes up the transverse cross-sectional area is contained within at least one of the plurality of identically dimensioned sub-areas.

16. The method according to claim 1, wherein the one or more manufacturing parameters are controlled to produce the aerosol-forming rods having a cross-sectional porosity of between about 0.15 and about 0.50, the cross-sectional porosity being an area fraction of void space of a transverse cross-sectional area of a rod of the aerosol-forming rods, the transverse cross-sectional area being an area of the rod in a plane perpendicular to a longitudinal axis of the rod.

17. The method according to claim 1, wherein the one or more manufacturing parameters are controlled to produce the aerosol-forming rods having a cross-sectional porosity distribution value of between about 0.04 and about 0.22, the cross-sectional porosity distribution value being a standard deviation of void space within each of a plurality of identically dimensioned sub-areas of a transverse cross-sectional area of the continuous rod.

18. The method according to claim 1, further comprising assembling at least one aerosol-forming rod with a plurality of other components within a wrapper to form at least one heated aerosol-generating article.

19. The method according to claim 18, wherein the values of cross-sectional porosity and cross-sectional porosity distribution of the assembled at least one aerosol-forming rod are selected to provide a predetermined resistance to draw through the formed at least one heated aerosol-generating article.

20. The method according to claim 18, wherein the aerosol-forming material comprises nicotine, and the values of cross-sectional porosity and cross-sectional porosity distribution of the assembled at least one aerosol-forming rod are selected to provide predetermined levels of nicotine delivery from the formed at least one heated aerosol-generating article when consumed.

* * * * *